US012567391B2

(12) United States Patent
Yin et al.

(10) Patent No.: US 12,567,391 B2
(45) Date of Patent: Mar. 3, 2026

(54) AMBIENT-LIGHT DETECTION CIRCUIT AND DETECTION METHOD, AND DISPLAY APPARATUS

(71) Applicant: BOE Technology Group Co., Ltd., Beijing (CN)

(72) Inventors: Xinshe Yin, Beijing (CN); Hui Zhao, Beijing (CN)

(73) Assignee: BOE TECHNOLOGY GROUP CO. , LTD., Beijing (CN)

(*) Notice: Subject to any disclaimer, the term of this patent is extended or adjusted under 35 U.S.C. 154(b) by 0 days.

(21) Appl. No.: 18/845,513

(22) PCT Filed: Jul. 26, 2023

(86) PCT No.: PCT/CN2023/109405
§ 371 (c)(1),
(2) Date: Sep. 10, 2024

(87) PCT Pub. No.: WO2024/022408
PCT Pub. Date: Feb. 1, 2024

(65) Prior Publication Data

US 2025/0210008 A1 Jun. 26, 2025

(30) Foreign Application Priority Data

Jul. 28, 2022 (CN) ........................ 202210903883.1

(51) Int. Cl.
*G09G 5/10* (2006.01)

(52) U.S. Cl.
CPC ....... *G09G 5/10* (2013.01); *G09G 2320/0626* (2013.01); *G09G 2360/144* (2013.01); *G09G 2360/16* (2013.01)

(58) Field of Classification Search
CPC ............ G09G 5/10; G09G 2320/0626; G09G 2360/144; G09G 2360/16; G09G 3/20;
(Continued)

(56) References Cited

U.S. PATENT DOCUMENTS

| | | | |
|---|---|---|---|
| 9,576,542 B1 | 2/2017 | Pollack et al. | |
| 2023/0033688 A1* | 2/2023 | Murakawa | H04N 25/671 |

FOREIGN PATENT DOCUMENTS

| | | |
|---|---|---|
| CN | 203968287 U | 11/2014 |
| CN | 108877614 A | 11/2018 |

(Continued)

OTHER PUBLICATIONS

International Search Report and Written Opinion mailed on Nov. 13, 2023, in corresponding PCT/CN2023/109405, 16 pages.

*Primary Examiner* — Rodney Amadiz
(74) *Attorney, Agent, or Firm* — XSENSUS LLP

(57) ABSTRACT

A detection circuit includes: a plurality of sensing modules, where a sensing module of the plurality of sensing modules is configured to collect ambient light and output a current sensing signal based on the ambient light; a plurality of current conversion modules, where a current conversion module of the plurality of current conversion modules is configured to convert a current sensing signal output by a sensing module connected to the current conversion module into a voltage sensing signal; a plurality of storage modules, where a storage module of the plurality of storage modules is configured to store a voltage sensing signal output by a current conversion module connected to the storage module in response to a sampling control signal; and a control module, where the control module is configured to output the sampling control signal synchronously to each storage module of the plurality of storage modules.

18 Claims, 3 Drawing Sheets

(58) Field of Classification Search
CPC ... G09G 5/02; G09G 2360/14; G09G 2360/18
See application file for complete search history.

(56) References Cited

FOREIGN PATENT DOCUMENTS

| | | | |
|---|---|---|---|
| CN | 113490308 | A | 10/2021 |
| CN | 113552556 | A | 10/2021 |
| CN | 114637423 | A | 6/2022 |
| CN | 115240579 | A | 10/2022 |
| CN | 116507889 | A | 7/2023 |
| CN | 117795588 | A | 3/2024 |
| KR | 10-0824858 | B1 | 4/2008 |

* cited by examiner

AMBIENT-LIGHT DETECTION CIRCUIT AND DETECTION METHOD, AND DISPLAY APPARATUS

CROSS-REFERENCE TO RELATED APPLICATIONS

The present application is a U.S. national stage of International Application No. PCT/CN2023/109405, filed on Jul. 26, 2023, and claims priority to Chinese Patent Application No. 202210903883.1 entitled "Detection circuit for ambient light, detection method for ambient light, and display apparatus", filed on Jul. 28, 2022, and the entire contents of both of which are incorporated herein by reference.

TECHNICAL FIELD

The present disclosure relates to the field of display technology, and in particular, to a detection circuit for ambient light, a detection method for ambient light, and a display apparatus.

BACKGROUND

With the development of the display technology, more and more functions can be achieved by a display device; for example, a display device may collect ambient light by itself, and may perform display color and temperature adjustment and display brightness adjustment according to the ambient light, or the like. In the related art, a sensing device for sensing ambient light has a problem of asynchronous signal sensing.

It should be noted that the information disclosed in the above background part is only used to enhance the understanding of the background of the present disclosure, and therefore may include information that does not constitute the related art known to those of ordinary skill in the art.

SUMMARY

An objective of the present disclosure is to overcome the shortcomings of the related art, and provide a detection circuit for ambient light, a detection method for ambient light, and a display apparatus.

According to an aspect of the present disclosure, there is provided a detection circuit for ambient light, configured to perform ambient light detection on a display panel, where the detection circuit includes: a plurality of sensing modules, where a sensing module is configured to collect ambient light and output a current sensing signal based on the ambient light; a plurality of current conversion modules, provided correspondingly to the plurality of sensing modules, where a current conversion module is configured to convert a current sensing signal output by a sensing module connected to the current conversion module into a voltage sensing signal; a plurality of storage modules, provided correspondingly to the plurality of current conversion modules, where a storage module is configured to store a voltage sensing signal output by a current conversion module connected to the storage module in response to a sampling control signal; and a control module, connected to the storage module respectively, where the control module is configured to output the sampling control signal synchronously to each storage module.

In some embodiments of the present disclosure, the detection circuit further includes: a gating module, connected in series between the storage modules and the control module, where the gating module is configured to turn on a communication path between a corresponding storage module and the control module in response to a gating control signal output by the control module; an analog-to-digital conversion module, connected in series between the gating module and the control module, where the analog-to-digital conversion module is configured to convert an obtained voltage sensing signal into a digital voltage signal for output; and a level-shift module, connected to the control module, where the level-shift module is configured to shift the sampling control signal into a corresponding level signal for output.

In some embodiments of the present disclosure, the current conversion module includes: a signal amplification unit, where an input end of the signal amplification unit is connected to a reference voltage end, and another input end of the signal amplification unit is connected to an output end of a corresponding sensing module; a gain adjustment unit, where an end of the gain adjustment unit is connected to the output end of the corresponding sensing module, another end of the gain adjustment unit is connected to an output end of the signal amplification unit, and the gain adjustment unit is configured to determine the voltage sensing signal according to a selected gain coefficient; and a feedback unit, connected in parallel to two ends of the gain adjustment unit, where the feedback unit is configured to prevent the signal amplification unit from being self-excited.

In some embodiments of the present disclosure, the gain adjustment unit includes a plurality of gain branches connected in parallel, and a gain branch includes: a gain resistor; a gain control switch, connected in series with the gain resistor, where the gain control switch is configured to turn on a corresponding gain branch in response to a gain control signal output by the control module, to adjust a gain coefficient of the gain adjustment unit. The feedback unit includes a feedback capacitor connected in parallel between two ends of the gain branch. The signal amplification unit includes an operational amplifier, where an input end of the operational amplifier is connected to the reference voltage end, and another input end of the operational amplifier is connected to an output end of a corresponding sensing module.

In some embodiments of the present disclosure, a ratio of an on-resistance of the gain control switch to a gain resistance connected to the gain control switch is less than or equal to 1%.

In some embodiments of the present disclosure, a ratio of a leakage current of the gain control switch to a sensing current of a sensing module connected to the gain control switch is less than or equal to 1%.

In some embodiments of the present disclosure, gain branches with a same gain coefficient in different current conversion modules multiplex with a same gain control signal; and on-levels of gain control signals corresponding to gain branches with different gain coefficients do not overlap with each other.

In some embodiments of the present disclosure, in a process of performing light signal collection according to any gain coefficient, an on-level of the sampling control signal at least partially overlaps with an on-level of the gain control signal, and an on-level start time of the sampling control signal is later than an on-level start time of the gain control signal.

In some embodiments of the present disclosure, the gain adjustment unit includes a first gain branch, a second gain branch, a third gain branch and a fourth gain branch; and, a resistance value of a gain resistor in the first gain branch, a resistance value of a gain resistor in the second gain branch, a resistance value of a gain resistor in the third gain branch, and a resistance value of a gain resistor in the fourth gain branch are increased sequentially.

In some embodiments of the present disclosure, the storage module includes: a filtering unit, connected between a corresponding operational amplifier and the gating module; and a sampling switch, connected in series between the filtering unit and the corresponding operational amplifier, where a control end of the sampling switch receives the sampling control signal; and where, in response to the sampling control signal, the sampling switch transmits a voltage sensing signal output by a current conversion module connected to the sampling switch to the filtering unit for storage.

In some embodiments of the present disclosure, the filtering unit includes: a filtering resistor, where an end of the filtering resistor is connected to a first end of the filtering unit, and another end of the filtering resistor is connected to a second end of the filtering unit; and a storage capacitor, where an end of the storage capacitor is connected to the second end of the filtering unit, and another end of the storage capacitor is grounded.

In some embodiments of the present disclosure, the gating module includes a plurality of gating switches, where the plurality of gating switches are provided in one-to-one correspondence with the plurality of storage modules, and a control end of a gating switch receives the gating control signal; where a ratio of a time constant formed by an off-resistance of any gating switch and the storage capacitor to a sampling period is greater than or equal to 10/n, n is a number of gain branches included in the current conversion module, and n is a positive integer greater than or equal to 1.

In some embodiments of the present disclosure, the control module is further configured to: obtain a digital voltage signal corresponding to a voltage sensing signal output by each gain branch; and select a digital voltage signal in a preset voltage range as an effective voltage signal.

In some embodiments of the present disclosure, the plurality of sensing modules includes a first sensing module, a second sensing module, a third sensing module and a fourth sensing module; the first sensing module is configured to sense ambient red light, the second sensing module is configured to sense ambient green light, the third sensing module is configured to sense ambient blue light, and the fourth sensing module is configured to sense white light.

According to a second aspect of the present disclosure, there is further provided a detection method for ambient light, applied to the detection circuit for ambient light according to any embodiment of the present disclosure; the method is performed by a control module; and the method includes: controlling each current conversion module to be turned on synchronously in a sampling period; outputting a sampling control signal of an on-level synchronously to each storage module within an on-duration of the current conversion module, to control each storage module to store a voltage sensing signal output by a current conversion module connected to the storage module; and obtaining a voltage sensing signal stored in each storage module respectively, and preforming preprocessing on each voltage sensing signal.

In some embodiments of the present disclosure, the method includes: controlling each current conversion module to be turned on synchronously in a sampling period; outputting a sampling control signal synchronously to each storage module within an on-duration of the current conversion module, to control each storage module to store a voltage sensing signal output by a current conversion module connected to the storage module; outputting a gating control signal to the gating module to transmit a voltage sensing signal stored in a corresponding storage module to the analog-to-digital conversion module, where the analog-to-digital conversion module is configured to convert the obtained voltage sensing signal into a digital voltage signal; performing selection on the digital voltage signal; and, if the digital voltage signal is an effective voltage signal, storing the effective voltage signal.

In some embodiments of the present disclosure, the method includes: outputting a gain control signal in a time-sharing manner according to a preset time sequence in a sampling period, to turn on each gain branch in a time-sharing manner; after outputting a gain control signal of an on-level for a preset duration, outputting a sampling control signal of an on-level synchronously to each storage module to control each storage module to store a voltage sensing signal output by a current conversion module connected to the storage module, where the on-level of the sampling control signal at least partially overlaps with the on-level of the gain control signal; outputting a gating control signal to the gating module to transmit a voltage sensing signal stored in a corresponding storage module to the analog-to-digital conversion module, where the obtained voltage sensing signal is converted into a digital voltage signal by the analog-to-digital conversion module; performing selection on the digital voltage signal; and, if the digital voltage signal is an effective voltage signal, storing the effective voltage signal According to a third aspect of the present disclosure, there is further provided a display apparatus, including the detection circuit for ambient light according to any embodiment of the present disclosure.

According to the detection circuit for ambient light provided by the present disclosure, each sensing module outputs a current sensing signal based on the collected ambient light; a corresponding current conversion module converts the current sensing signal into a corresponding voltage sensing signal and outputs the voltage sensing signal to a storage module connected to the current conversion module; and, a control module outputs a sampling control signal synchronously to each storage module to control each storage module to be turned on synchronously. Therefore, each storage module can synchronously store the ambient light signal collected by a corresponding sensing module at the same moment; that is, the synchronous collection of each sensing module is realized. Thus, the problem that the light signals of different sensing modules are not synchronized in the related art is solved.

It is to be understood that both the foregoing general description and the following detailed description are exemplary and explanatory only and are not restrictive of the disclosure.

BRIEF DESCRIPTION OF THE DRAWINGS

The accompanying drawings here, which are incorporated in and constitute a part of the description, illustrate embodiments consistent with the present disclosure, and together with the description serve to explain the principles of the present disclosure. Obviously, the accompanying drawings in the following description are some embodiments of the present disclosure; and, for those of ordinary skill in the art, other drawings can also be obtained from these drawings without creative efforts.

DETAILED DESCRIPTION

Figure 1:
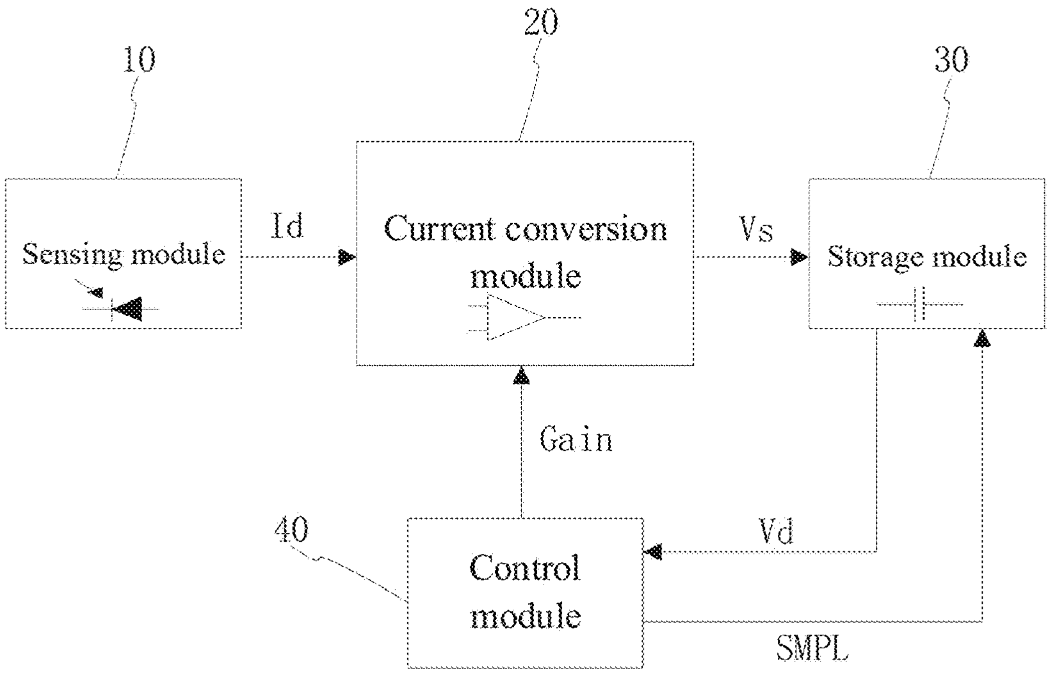
FIG. 1 is a structural block diagram of a detection circuit for ambient light according to an embodiment of the present disclosure.

Example embodiments will now be described more fully with reference to the accompanying drawings. Example embodiments, however, can be implemented in various forms and should not be construed as limited to the embodiments set forth herein; by contrast, these embodiments are provided so that the present disclosure will be thorough and complete, and will fully convey the concept of example embodiments to those skilled in the art. The matching reference numerals in the drawings denote the matching or similar structures, and thus their detailed descriptions will be omitted. In addition, the drawings are merely schematic illustrations of the present disclosure and are not necessarily drawn to scale.

FIG. 1 is a structural block diagram of a detection circuit for ambient light according to an embodiment of the present disclosure. The detection circuit for ambient light may be configured to detect and perform ambient light detection on a display panel. As shown in FIG. 1, the detection circuit may include a plurality of sensing modules 10, a plurality of current conversion modules 20, a plurality of storage modules 30, and a control module 40; where, the sensing module 10 may be configured to collect ambient light and output a current sensing signal Id based on the ambient light; the plurality of current conversion modules 20 are provided corresponding to the plurality of sensing modules 10, and the current conversion module 20 is configured to convert the current sensing signal Id output by the sensing module 10 connected to the current conversion module 20 into a voltage sensing signal Vs; the plurality of storage modules 30 are provided corresponding to the plurality of current conversion modules 20, and the storage module 30 may be configured to store the voltage sensing signal Vs output by the current conversion module 20 connected to the storage module 30 in response to a sampling control signal SMPL; and, the control module 40 is connected to the storage module 30, and the control module 40 may be configured to output a sampling control signal SMPL synchronously to each storage module 30.

According to the detection circuit for ambient light provided by the present disclosure, each sensing module 10 outputs a current sensing signal Id based on the collected ambient light; the corresponding current conversion module 20 converts the current sensing signal Id into a corresponding voltage sensing signal Vs and outputs the voltage sensing signal Vs to the storage module 30 connected to the current conversion module 20; and the control module 40 outputs a sampling control signal SMPL synchronously to each storage module 30 to control each storage module 30 to be turned on synchronously. Therefore, each storage module 30 can synchronously store the ambient light signal collected by the corresponding sensing module 10 at the same moment; that is, the synchronous collection of each sensing module is realized. Thus, the problem that the light signals of different sensing modules 10 are not synchronized in the related art is solved.

Figure 2:
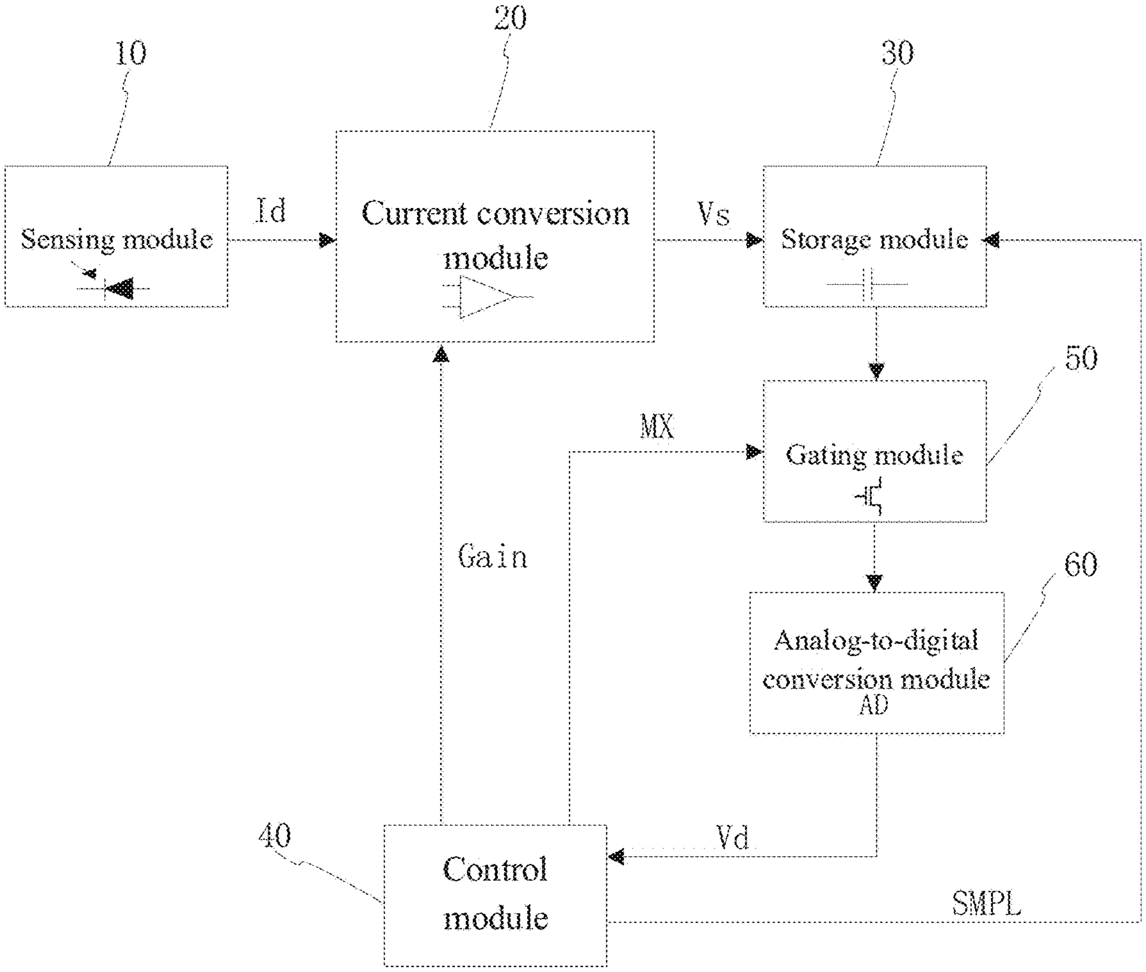
FIG. 2 is a structural block diagram of a detection circuit for ambient light according to another embodiment of the present disclosure.
Figure 3:
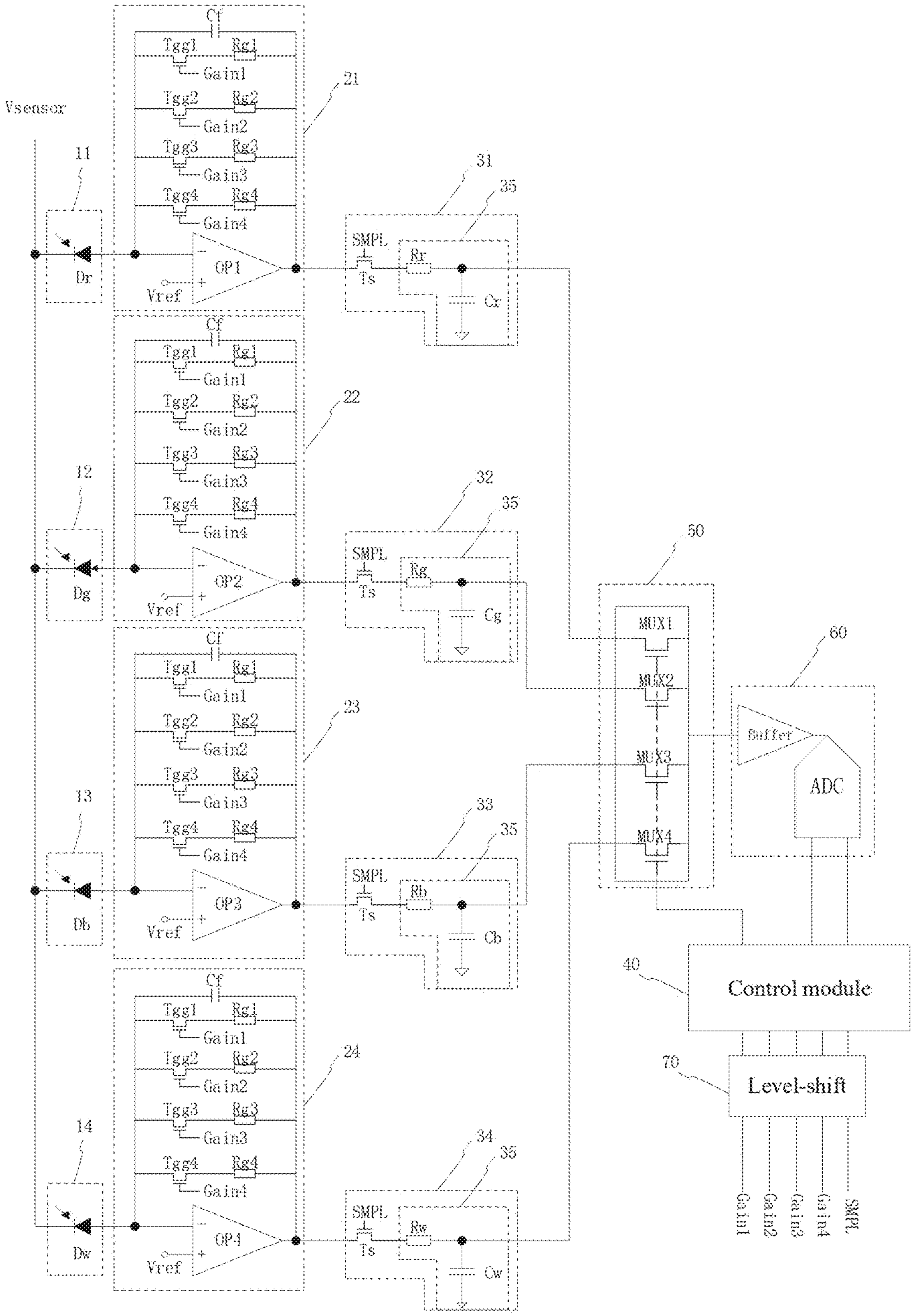
FIG. 3 is a schematic structural diagram of a detection circuit for ambient light according to an embodiment of the present disclosure.

FIG. 2 is a structural block diagram of a detection circuit for ambient light according to another embodiment of the present disclosure. FIG. 3 is a schematic structural diagram of a detection circuit for ambient light according to an embodiment of the present disclosure. As shown in FIG. 3, in some embodiments, the detection circuit may further include a gating module 50, an analog-to-digital conversion module 60, and a level-shift module 70; where, the gating module 50 is connected in series between the storage module 30 and the control module 40, and the gating module 50 may be configured to turn on a communication path between a corresponding storage module 30 and the analog-to-digital conversion module 60 in response to a gating control signal MX output by the control module 40; the analog-to-digital conversion module 60 is connected in series between the gating module 50 and the control module 40, and the analog-to-digital conversion module 60 may be configured to convert the obtained voltage sensing signal Vs into a digital voltage signal Vd for output; and, the level-shift module 70 is connected to the control module 40, and the level-shift module 70 may be configured to shift the sampling control signal SMPL and the gating control signal MX into corresponding level signals for output.

As shown in FIG. 3, in example embodiments, the gating module 50 may include a plurality of gating switches MUX, and the gating switch MUX may be, for example, a transistor switch. The number of the gating switches MUX may be in one-to-one correspondence with the number of the storage modules 30; that is, one gating switch MUX is connected to one storage module 30; and, when the gating switch MUX is turned on, the voltage sensing signal Vs stored in the storage module 30 connected to the gating switch MUX may be transmitted to the analog-to-digital conversion module 60. For example, the storage modules 30 may include a first storage module 31 to a fourth storage module 34, and the gating modules 50 may include a first gating switch MUX1 to a fourth gating switch MUX4; the first gating switch MUX1 is connected between the first storage module 31 and the analog-to-digital conversion module 60; the second gating switch MUX2 is connected between the second storage module 32 and the analog-to-digital conversion module 60; the third gating switch MUX3 is connected between the third storage module 33 and the analog-to-digital conversion module 60; and, the fourth gating switch MUX4 is connected between the fourth storage module 34 and the analog-to-digital conversion module 60. When the first gating switch MUX1 is turned on, the voltage sensing signal Vs stored in the first storage module 31 may be transmitted to the analog-to-digital conversion module 60. When the second gating switch MUX2 is turned on, the voltage sensing signal Vs stored in the second storage module 32 may be transmitted to the analog-to-digital conversion module 60, and so on. The control module 40 outputs the gating control signal MX sequentially, so that the analog-to-digital conversion module 60 can obtain the voltage sensing signal Vs of each storage module 30, respectively.

After the current sensing signal Id output by each sensing module 10 is converted into a corresponding voltage sensing signal Vs through the current conversion module 20, the control module 40 outputs a sampling control signal SMPL to each storage module 30 to turn on the communication path between each storage module 30 and the corresponding current conversion module 20, so that the voltage sensing signal Vs output by the current conversion module 20 can be transmitted to the storage module 30 for storage. The control module 40 further outputs the gating control signal MX for controlling the gating module 50 to turn on the storage module 30 and the analog-to-digital conversion module 60 in sequence, so as to convert the voltage sensing signal Vs stored in each storage module 30 into the digital voltage signal Vd through the analog-to-digital conversion module 60 and output the digital voltage signal Vd to the control module 40, and the digital voltage signal Vd is stored by the control module 40. The display apparatus may perform display adjustment based on the stored digital voltage signal Vd. For example, the related control device of the display apparatus may access the control module 40 through a serial interface, and adjust the display brightness according to the stored digital voltage signal Vd. For example, according to the level signal, it may be determined that the current ambient light is relatively darker, and then, the display brightness may be reduced, or the like.

FIG. 3 is a schematic structural diagram of a detection circuit for ambient light according to an embodiment of the present disclosure. As shown in FIG. 3, in example embodiments, the detection circuit may include four sensing modules of a first sensing module 11 to a fourth sensing module 14; the first sensing module 11 may be configured to sense red light; the second sensing module 12 may be configured to sense green light; the third sensing module 13 may be configured to sense blue light; and, the fourth sensing module 14 may be configured to sense white light. The control module 40 or other control devices of the display apparatus may calculate the color temperature of the current ambient light and the current ambient light intensity according to the sensing signal of the first sensing module 11, the sensing signal of the second sensing module 12, and the sensing signal of the third sensing module 13, and may further perform verification on the calculated ambient light intensity according to the sensing signal of the fourth sensing module 14. It should be understood that the first sensing module 11 to the fourth sensing module 14 may have a same circuit structure; for example, they may be formed by a same photoelectric sensor; and, by providing color film layers on the photoelectric sensor, the first sensing module 11, the second sensing module 12 and the third sensing module 13 may be formed respectively.

Correspondingly, as shown in FIG. 3, the plurality of current conversion modules 20 may include a first current conversion module 21 to a fourth current conversion module 24, and the plurality of storage modules 30 may include a first storage module 31 to a fourth storage module 34. The first current conversion module 21 is connected to the first sensing module 11, and is configured to convert the current sensing signal Idr output by the first sensing module 11 into a corresponding voltage sensing signal Vsr; and, the first storage module 31 is connected between the first current conversion module 21 and the gating module 50, and is configured to store the voltage sensing signal Vsr output by the first current conversion module 21. The second current conversion module 22 is connected to the second sensing module 12, and is configured to convert the current sensing signal Idg output by the second sensing module 12 into a corresponding voltage sensing signal Vsg; and, the second storage module 32 is connected between the second current conversion module 22 and the gating module 50 to store the voltage sensing signal Vsg output by the second current conversion module 22. The third current conversion module

23 is connected to the third sensing module 13, and is configured to convert the current sensing signal Idb output by the third sensing module 13 into a corresponding voltage sensing signal Vsb; and, the third storage module 33 is connected between the third current conversion module 23 and the gating module 50 to store the voltage sensing signal Vsb output by the third current conversion module 23. The fourth current conversion module 24 is connected to the fourth sensing module 14, and is configured to convert the current sensing signal Idw output by the fourth sensing module 14 into a corresponding voltage sensing signal Vsw; and, the fourth storage module 34 is connected between the fourth current conversion module 24 and the gating module 50 to store the voltage sensing signal Vsw output by the fourth current conversion module 24.

The various functional modules in the detection circuit are further described below with reference to the accompanying drawings.

As shown in FIG. 3, in some embodiments, the sensing module 10 may include a photoelectric sensor, a cathode of the photoelectric sensor may be connected to a voltage end Vsensor, and an anode of the photoelectric sensor may be connected to an input end of the current conversion module 20. The sensing module 10 may output a current sensing signal Id of a corresponding magnitude based on the light signal. The current sensing signal Id is output to the current conversion module 20, and is converted into a voltage sensing signal Vs by the current conversion module 20.

As shown in FIG. 3, in some embodiments, the current conversion module 20 may include a signal amplification unit, a gain adjustment unit and a feedback unit. An input end of the signal amplification unit is connected to a reference voltage end, and the other input end of the signal amplification unit is connected to the output end of the corresponding sensing module 10. An end of the gain adjustment unit is connected to the output end of the corresponding sensing module 10, the other end of the gain adjustment unit is connected to the output end of the signal amplification unit, and the gain adjustment unit is configured to determine the voltage sensing signal Vs according to a selected gain coefficient. The feedback unit is connected in parallel to two ends of the gain adjustment unit, and the feedback unit is configured to prevent the signal amplification unit from being self-excited, thus increasing the stability of the signal amplification unit.

Among them, the signal amplification unit may include an operational amplifier OP, an input end of the operational amplifier OP is connected to the reference voltage end, and the other input end of the operational amplifier OP is connected to the output end of the corresponding sensing module 10. The feedback unit may include a feedback capacitor Cf, and the feedback capacitor Cf is connected in parallel to two ends of the gain branches. The gain adjustment unit may include a plurality of gain branches connected in parallel; each gain branch may include a gain resistor Rg and a gain control switch Tg; the gain resistor Rg is connected in series with the gain control switch Tg; and the gain control switch Tg may be configured to turn on the corresponding gain branch in response to a gain control signal Gain, so as to adjust the gain coefficient of the gain adjustment unit. The gain coefficient may be understood as an magnification times to the current sensing signal Id. Obviously, the magnitude of the gain resistor Rg determines the gain coefficient of the gain branch. By reasonably configuring the magnitude relationship of each gain resistor Rg, each gain level of the gain adjustment unit may be changed step by step according to a certain ratio. For example, as shown in FIG. 3, the gain adjustment unit may include four gain branches. For example, the gain resistors Rg of different gain branches are in a 10-multiple relationship; that is, Rg1=10*Rg2=10*10*Rg3=10*10*10*Rg4, so that the gain adjustment unit may have 10× levels. It should be understood that the minimum gain resistor Rg may be determined according to the maximum sensing current generated by the maximum brightness of the ambient light on the sensing module and the output voltage range of the operational amplifier OP in the current conversion module 20. In addition, the gain control signal Gain is output by the control module 40. When the gain control switch is a transistor switch, the control module 40 may output the gain control signal Gain to the level-shift module 70, and the level-shift module 70 shifts the gain control signal Gain into a high/low level signal and outputs the high/low level signal to each gain control switch Tg to drive and control the gain control switch Tg.

For example, the gain adjustment unit may include four gain branches, and each gain branch includes a gain resistor Rg and a gain control switch Tg connected in series; the gain resistors Rg of different gain branches are different; and when the gain control switch Tg of a certain gain branch is turned on, the gain branch is turned on, so that the gain adjustment unit has a corresponding gain coefficient, that is, the gain adjustment circuit outputs a voltage sensing signal Vs of a corresponding magnitude based on the gain coefficient. For example, the four gain branches may be a first gain branch, a second gain branch, a third gain branch, and a fourth gain branch; the first gain branch includes a first gain resistor Rg1 and a first gain control switch Tgg1; the second gain branch includes a second gain resistor Rg2 and a second gain control switch Tgg2; the third gain branch includes a third gain resistor Rg3 and a third gain control switch Tgg3; and the fourth gain branch includes a fourth gain resistor Rg4 and a fourth gain control switch Tgg4. The control module 40 may output the gain control signal Gain of the on-level sequentially in a time-sharing manner to turn on each gain branch in the time-sharing manner. The current conversion module 20 outputs the voltage sensing signal Vs of the corresponding size according to the gain coefficient of the turned-on gain branch. Obviously, in the case that the gain adjustment unit has the four gain branches mentioned above, the current conversion module 20 may output voltage sensing signals Vs with four different gain magnitudes. It can be understood that the on-level is determined according to the type of the gain control switch Tg. For example, if the gain control switch Tg is an N-type transistor switch, the on-level of the gain control signal Gain is a high level.

As shown in FIG. 3, in some embodiments, each current conversion module 20 may have the same structure. For example, each current conversion module 20 may include four gain branches, and structures of the four gain branches are correspondingly the same. In some embodiments, each current conversion module 20 may include a first gain branch, a second gain branch, a third gain branch, and a fourth gain branch; and, each first gain branch in the different current conversion modules 20 includes a first gain resistor Rg1 and a first gain control switch Tgg1, the second gain branch in each current conversion module 20 includes a second gain resistor Rg2 and a second gain control switch Tgg2, the third gain branch in each current conversion module 20 includes a third gain resistor Rg3 and a third gain control switch Tgg3, and the fourth gain branch in each current conversion module 20 includes a fourth gain resistor Rg4 and a fourth gain control switch Tgg4. On this basis, the control module 40 may output the gain control signal Gain synchronously to the same gain branch in each current conversion module 20, so that each current conversion module 20 outputs the voltage sensing signal Vs of the same gain level at the same moment. For example, the control module 40 may output the first gain control signal Gain1 synchronously to the four first gain control switches Tgg1 in FIG. 3 to control each current conversion module 20 to output the voltage sensing signal Vs of the first gain level synchronously.

As described above, the sensing module 10 may be a photoelectric sensor. Taking FIG. 3 as an example, a cathode of the photoelectric sensor may be connected to a voltage end Vsensor, an anode of the photoelectric sensor may be connected to an inverting input end of the operational amplifier OP, and a non-inverting input end of the operational amplifier OP may be connected to a reference voltage end Vref. According to the virtual short characteristic of the operational amplifier OP, the voltage of the anode of the sensing module 10 is Vref. The voltage of Vsensor may be set according to the electrical characteristic of the photoelectric sensor, and the inverting bias level of each photoelectric sensor may be further determined according to the voltage of Vsensor.

For example, as shown in FIG. 3, the first current conversion module 21 may include a first operational amplifier OP1, the second current conversion module 22 may include a second operational amplifier OP2, the third current conversion module 23 may include a third operational amplifier OP3, and the fourth current conversion module 24 may include a fourth operational amplifier OP4. When the first gain control signal Gain1 is the on-level, the first gain control switch Tgg1 is turned on, the first gain resistor Rg1 is connected to the sensing module 10, and the output voltage of the first operational amplifier OP1 is a voltage drop of the current sensing signal Id on the first gain resistor Rg1; that is, Vout=Vref−Id*Rg1. When the second gain control signal Gain 2 is the on-level, the second gain control switch Tgg2 is turned on, the second gain resistor Rg2 is connected to the sensing module 10, and the output voltage of the first operational amplifier OP1 is the voltage drop of the sensing current on the second gain resistor Rg2; that is, Vout=VreF−Id*Rg2. Similarly, when the third gain control signal is the on-level, the third gain resistor Rg3 is connected to the sensing module 10, and the output voltage is Vout=Vref-Id*Rg3. When the fourth gain control signal Gain4 is the on-level, the fourth gain resistor Rg4 is connected to the sensing module 10, and the output voltage is Vout=Vref-Id*Rg4. It can be seen that when the collection voltage range of the back-end analog-to-digital conversion module 60 is given, the larger the gain resistance Rg, the smaller the current that can be collected by the gain branch. For example, when Rg1=10*Rg2=10*10*Rg3=10*10*10*Rg4, the gain coefficient of the fourth gain branch is the maximum, and the gain coefficient of the first gain branch is the minimum; and correspondingly, the sensing voltage output by the fourth gain branch is the maximum, and the sensing voltage output by the first gain branch is the minimum.

In some embodiments, in any gain branch, the ratio of the on-resistance of the gain control switch Tg to the gain resistor Rg connected to the gain control switch Tg is less than or equal to 1%, such as 0.5%, 0.6%, 0.7%, 0.8%, 0.9%, 1%, or the like. For example, as shown in FIG. 3, for the first gain branch, the ratio of the on-resistance of the first gain control switch Tgg1 to the first gain resistor Rg1 is less than or equal to 1%, the ratio of the on-resistance of the second gain control switch Tgg2 to the second gain resistor Rg2 is less than or equal to 1%, the ratio of the on-resistance of the third gain control switch Tgg3 to the third gain resistor Rg3 is less than or equal to 1%, and the ratio of the on-resistance of the fourth gain control switch Tgg4 to the fourth gain resistor Rg4 is less than or equal to 1%. In the present disclosure, by setting the ratio of the on-resistance of the gain control switch Tg to the gain resistor Rg connected with the gain control switch Tg to be provided with the above relationship, the voltage drop of the gain control switch Tg when turned on can be fully reduced. Therefore, the voltage drop loss of the current sensing signal Id on the gain control switch Tg can be fully reduced, and the voltage sensing signal Vs output by the current conversion module 20 can reflect the current ambient light information more accurately. For example, the ambient light information may include light intensity, color temperature, or the like. In some embodiments, the gain control switch Tg may be a transistor switch; and, the on-resistance of the transistor switch may be reduced by increasing the width-to-length ratio of the channel region of the transistor switch.

In addition, in some embodiments, in any gain branch, the ratio of the leakage current of the gain control switch Tg to the sensing current of the sensing module 10 connected to the gain control switch Tg is less than or equal to 1%. For example, it may be 0.5%, 0.6%, 0.7%, 0.8%, 0.9%, 1%, or the like. For example, as shown in FIG. 3, in the first current conversion module 21, the ratio of the leakage current of the first gain control switch Tgg1 to the first sensing current of the first sensing module 11 is less than or equal to 1%, the ratio of the leakage current of the second gain control switch Tgg2 to the first sensing current of the first sensing module 11 is less than or equal to 1%, the ratio of the leakage current of the third gain control switch Tgg3 to the first sensing current of the first sensing module 11 is less than or equal to 1%, and the ratio of the leakage current of the fourth gain control switch Tgg4 to the first sensing current of the first sensing module 11 is less than or equal to 1%. It can be understood that the gain control switch of each gain branch in other current conversion modules 20 has the same leakage current characteristic, which will not be described in detail here. The advantage of such setting in the present disclosure is that, since only one gain control switch Tg is turned on in a current conversion module 20 at the same moment, the leakage current of the gain control switch Tg is reduced, and the gain branch in which the gain control switch Tg is not turned on will not cause leakage to the sensing current, so that the sensing current generated by the sensing module 10 will not or rarely be wasted by other gain branches which are not turned on. Therefore, the voltage sensing signal Vs output by the current conversion module 20 can reflect the current ambient light information more accurately.

As described above, the same gain branch in different current conversion modules 20 of the present disclosure may multiplex with the same gain control signal Gain, so that different current conversion modules 20 may output the voltage sensing signal Vs of the same gain level at the same moment. The same gain branch is the gain branch with the same gain coefficient.

Figure 4:
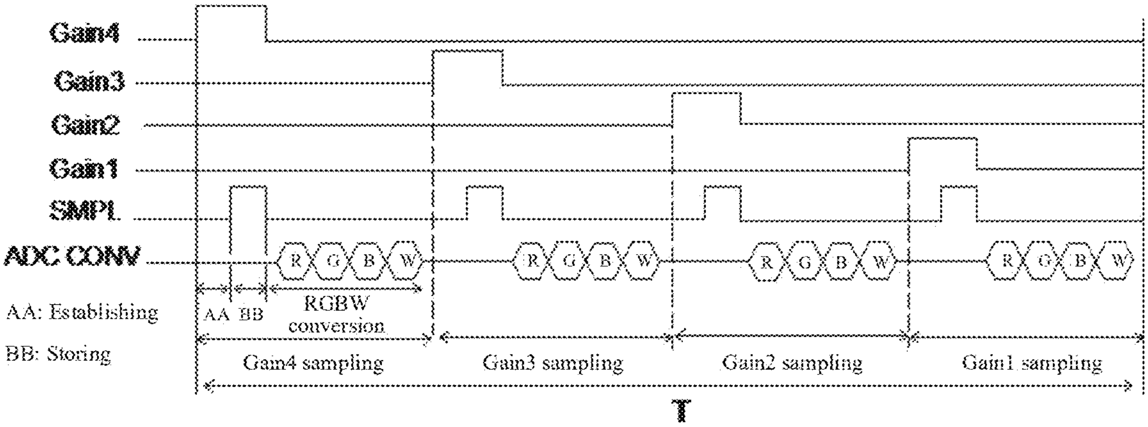
FIG. 4 is a time sequence diagram of a control signal in a sampling period according to an embodiment of the present disclosure.

For example, FIG. 4 is a time sequence diagram of a control signal in a sampling period according to an embodiment of the present disclosure, where T represents a sampling period. As shown in FIG. 4, the control module 40 completes signal collection of four gain coefficients in a sampling period; that is, a sampling period includes four sampling sub-periods, and a sampling sub-period is a signal collection duration for a gain coefficient. In other words, a sampling sub-period is a duration from when a gain control switch Tg is turned on and the current sensing signal Id is output to when the control module 40 obtain the digital voltage signal Vd of the gain level, that is, an interval duration from when a gain control switch is turned on to when a next gain control switch is turned on.

It should be understood that the duration of each sampling sub-period in FIG. 4 is the same, and in actual use, the sampling sub-periods corresponding to different gain coefficients may be different. For example, in some embodiments, the duration of the sampling sub-period may be correspondingly set according to the magnitude of the gain resistor in the gain branch.

For example, the on-duration of the gain control signal corresponding to the gain branch with a relatively larger gain resistance can be set to be relatively larger, and the on-level duration of the gain control signal corresponding to the gain branch with a relatively smaller gain resistance is set to be relatively smaller. The advantage of such setting is that, when the gain resistance is relatively larger, by setting the on-level duration of the gain control signal of the gain branch to be relatively longer, the sensing voltage signal of the gain branch can be fully released, thus preventing the gain resistor and the operational amplifier from self-excited oscillation. As shown in FIG. 4, in a sampling period, the control module 40 may sequentially output the fourth gain control signal Gain4, the third gain control signal Gain3, the second gain control signal Gain2 and the first gain control signal Gain1 in a time-sharing manner. The on-level of the fourth gain control signal Gain4 controls the fourth gain branches in the four current conversion modules 20 to be turned on at the same time, so that each current conversion module 20 outputs the voltage sensing signal Vs of the fourth gain level synchronously. Similarly, the on-level of the third gain control signal Gain3 may control the third gain branches in the four current conversion modules 20 to be turned on at the same time, so that each current conversion module 20 outputs the voltage sensing signal Vs of the third gain level synchronously. The on-level of the second gain control signal Gain2 may control the second gain branches in the four current conversion modules 20 to be turned on at the same time, so that each current conversion module 20 outputs the voltage sensing signal Vs of the second gain level synchronously. The on-level of the first gain control signal Gain1 may control the first gain branches in the four current conversion modules 20 to be turned on at the same time, so that each current conversion module 20 outputs the voltage sensing signal Vs of the first gain level synchronously. Therefore, the plurality of current sensing modules 10 are controlled to complete the signal collection of the four gain levels in a sampling period, respectively.

In addition, as described above, the storage module 30 is in one-to-one correspondence with the current conversion module 20 and the sensing module 10; that is, one sensing module 10 is connected to one current conversion module 20, and one current conversion module is connected to one storage module 30. The control module 40 may output the sampling control signal SMPL of the on-level synchronously to each storage module 30 to turn on each storage module 30 synchronously, so that each storage module 30 can store the voltage sensing signal Vs at the same moment.

The control module 40 may output the sampling control signal SMPL of the on-level within the on-level duration of the gain control signal Gain, so that the detection circuit may control the respective storage module 30 to store the voltage sensing signal Vs corresponding to the light signal at the same moment when performing light signal collection according to a certain gain. For example, after the fourth gain control signal Gain4 of the on-level is output, the control module 40 may output the sampling control signal SMPL of the on-level after a preset duration to turn on the connection between each storage module 30 and the corresponding current conversion module 20, thus controlling each storage module 30 to synchronously store the voltage sensing signal after each sensing module 10 performs signal amplification by using the same gain level. In the present disclosure, the on-level of the sampling control signal SMPL output by the control module 40 is later than the on-level of the gain control signal Gain, so that the voltage sensing signal Vs of the previous sampling sub-period stored in the feedback capacitor Cf can be fully released, thus ensuring that the voltage sensing signal Vs stored in the feedback capacitor Cf reflects the light signal at the current sampling moment more accurately. It can be understood that the on-level of the sampling control signal SMPL varies with the type of the sampling switch Ts. For example, when the sampling switch Ts is an N-type transistor switch, the on-level of the sampling control signal SMPL is a high level.

As shown in FIG. 3, in some embodiments, the storage module 30 may include a storage capacitor, a filtering unit 35, and a sampling switch Ts. The filtering unit 35 is connected between the corresponding operational amplifier OP and the gating module 50, the sampling switch Ts is connected in series between the filtering unit 35 and the corresponding operational amplifier OP, and the control end of the sampling switch Ts receives the sampling control signal SMPL; where the sampling switch Ts transmits the voltage sensing signal Vs output by the current conversion module 20 connected to the sampling switch Ts to the filtering unit 35 for storage in response to the sampling control signal SMPL.

Among them, as described above, in some embodiments, the current conversion module 20 outputs a voltage sensing signal Vs through the operational amplifier OP. The sampling switch Ts is connected in series between the filtering unit 35 and the corresponding operational amplifier OP, so that the sampling switch Ts may respond to the sampling control signal SMPL to control the filtering unit 35 to be connected to the operational amplifier OP at the corresponding position or disconnected from the operational amplifier OP at the corresponding position. When the sampling control signal SMPL is an on-level, the sampling switch Ts is turned on, and the filtering unit 35 is connected to the operational amplifier OP at the corresponding position to obtain the voltage sensing signal Vs output by the operational amplifier OP for storage. When the sampling control signal SMPL is not an on-level, the sampling switch Ts is disconnected, and the filtering unit 35 is disconnected from the operational amplifier OP at the corresponding position.

The filtering unit 35 may include a filtering resistor R and a storage capacitor C, where the storage capacitor and the filtering resistor form a low-pass filter. One end of the filtering resistor R is connected to the first end of the filtering unit 35, and the other end of the filtering resistor R is connected to the second end of the filtering unit 35. One end of the storage (filtering) capacitor C is connected to the second end of the filtering unit 35, and the other end of the storage capacitor C is grounded. The filtering resistor R and the storage capacitor C may form a low-pass filter. As described above, when the sampling switch Ts is turned on, the voltage sensing signal Vs output by the operational amplifier OP is transmitted to the storage capacitor C for storage, and the control module 40 may further control the gating module 50 to be turned on, so as to output the voltage sensing signal Vs stored in the storage capacitor C to the analog-to-digital conversion module 60 and convert it into the digital voltage signal Vd.

As shown in FIG. 4, in some embodiments, the on-level of the sampling control signal SMPL and the on-level of the gain control signal Gain may at least partially overlap with each other, so that each storage unit can store the voltage sensing signal Vs at the same gain level. For example, the control module 40 may output the sampling control signal SMPL of the on-level within the on-level duration of the gain control signal Gain.

In addition, as shown in FIG. 4, in the light signal sampling process of any gain, the on-level start time of the sampling control signal SMPL is later than the on-level start time of the gain control signal Gain. In some embodiments, after outputting the gain control signal Gain of the on-level, the control module 40 may output the sampling control signal SMPL of the on-level after a preset duration to turn on the connection between each storage module 30 and the corresponding current conversion module 20, thus controlling each storage module 30 to synchronously store the voltage sensing signal Vs after each sensing module 10 performs signal amplification by using the same gain level. In the present disclosure, the on-level of the sampling control signal SMPL output by the control module 40 is later than the on-level of the gain control signal Gain, and this delay time needs to ensure that the voltage sensing signal Vs at the previous moment stored in the feedback capacitor Cf is fully released, so as to eliminate the influence of the residual signal on the voltage sensing signal Vs at the current sampling moment.

In some embodiments, the gating module 50 may include a plurality of gating switches MUX, and the gating switch MUX may be, for example, a transistor switch. The number of gating switches MUX may be in one-to-one correspondence with the number of storage modules 30; that is, a gating switch MUX is connected to a storage module 30. When the gating switch MUX is turned on, the voltage sensing signal Vs stored in the storage module 30 connected to the gating switch MUX may be transmitted to the analog-to-digital conversion module 60. For example, as shown in FIG. 3, the storage module 30 may include a first storage module 31 to a fourth storage module 34, and the gating module 50 may be a 4:1 MUX switch.

In some embodiments, the gating module 50 may include a first gating switch MUX1 to a fourth gating switch MUX4, the first gating switch MUX1 is connected between the first storage module 31 and the analog-to-digital conversion module 60, the second gating switch MUX2 is connected between the second storage module 32 and the analog-to-digital conversion module 60, the third gating switch MUX3 is connected between the third storage module 33 and the analog-to-digital conversion module 60, and the fourth gating switch MUX 4 is connected between the fourth storage module 34 and the analog-to-digital conversion module 60. When the first gating switch MUX1 is turned on, the voltage sensing signal Vs stored in the first storage module 31 may be transmitted to the analog-to-digital conversion module 60. When the second gating switch MUX2 is turned on, the voltage sensing signal Vs stored in the second storage module 32 may be transmitted to the analog-to-digital conversion module 60, and so on. The control module 40 sequentially outputs the gating control signals MX, so that the analog-to-digital conversion module 60 can obtain the voltage sensing signal Vs of each storage module 30 respectively.

In some embodiments, the ratio of the time constant T formed by the off-resistance of any gating switch MUX and the storage capacitor to a sampling period may be greater than or equal to 10/n, n is the number of gain branches included in the current conversion module, and n is a positive integer greater than or equal to 1; for example, n may be 10, 11, 12, 13, 14, or 15. Here, a sampling period includes four sampling sub-periods in FIG. 4. In other words, the ratio of the time constant T formed by the storage capacitor to a sampling sub-period is greater than or equal to 10. Since the magnitude of the storage capacitor has been determined, increasing the time constant T formed by the off-resistor of the gating switch MUX and the storage capacitor requires to increase the off-resistance of the gating switch MUX, thus reducing the leakage current of the gating switch MUX. According to the above method of the present disclosure, the off-resistance of the gating switch MUX can be fully increased, so that the sensing voltage stored in the filtering unit 35 can be prevented from leakage through the gating switch MUX that is not turned on, thus the voltage sensing signal Vs output by the filtering module to the analog-to-digital conversion module 60 can reflect the current light signal more accurately.

In some embodiments, the gating switch MUX may be implemented by a transistor, and the off-resistance of the gating switch MUX may be increased by increasing the width-to-length ratio of the channel region of the transistor.

The analog-to-digital conversion module 60 in the present disclosure may be an integrated device, for example, may be an analog-to-digital conversion chip, and the sampling precision of the analog-to-digital conversion module 60 needs to match the use requirements of the display apparatus. The specific process and principle of the analog-to-digital conversion module 60 will not be described in detail here. The level-shift module 70 may shift the control signal generated by the control module 40 into a high/low level signal (VGH/VGL) to drive the gain control switch Tg, the sampling switch Ts, and the gating switch MUX.

In some embodiments, the control module 40 may be further configured to perform selection on the digital voltage signal Vd output by the analog-to-digital conversion module 60, and store the qualified digital voltage signal Vd as the effective voltage signal of the current sampling period. For example, the control module 40 may compare the digital voltage signal Vd of each gain level with the two end value voltages of a preset voltage range. When the digital voltage signal Vd is within the preset voltage range, the control module 40 may store the digital voltage signal Vd as the effective voltage signal of the current sampling period. The control module 40 performs sampling for the next sampling sub-period, and performs selection on the digital voltage signal Vd by using the same method. In addition, it should be understood that, in a sampling period, when there are digital voltage signals Vd with more than one gain level within the preset voltage range, the control module 40 may store the digital voltage signal Vd with the maximum value as the effective voltage signal of the current sampling period. It should be understood that the above method for determining the effective voltage signal is merely an exemplary description, and should not be construed as a limitation to the present disclosure, and in other embodiments of the present disclosure, the effective voltage signal of each sampling period may also be determined in other manners.

Figure 5:
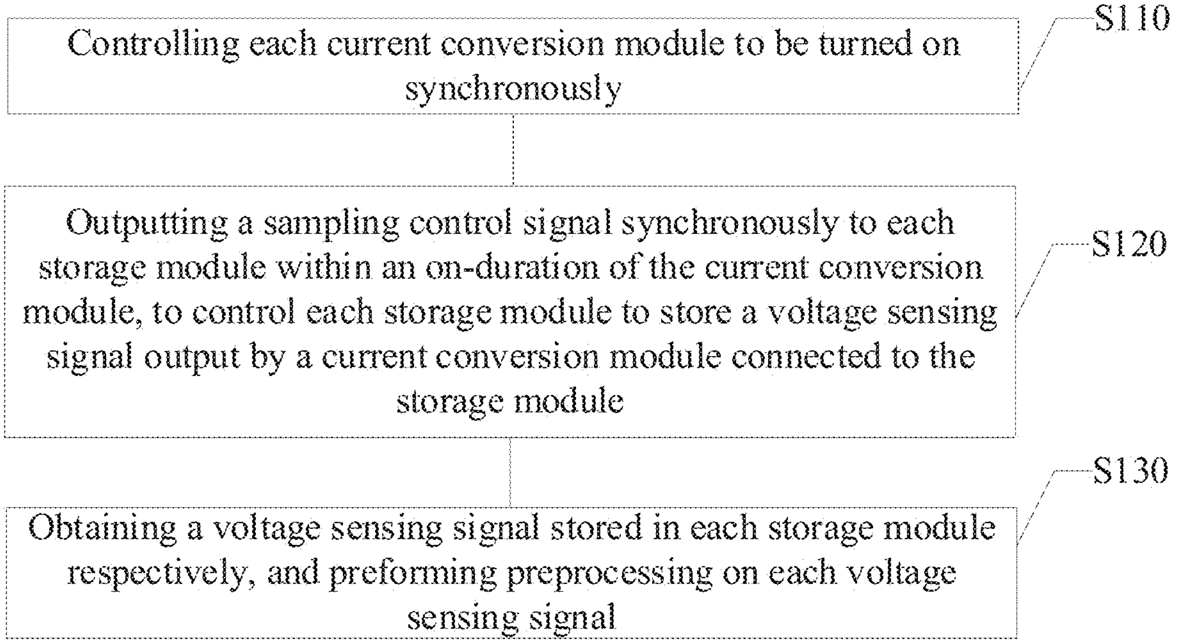
FIG. 5 is a flowchart of a detection method for ambient light according to an embodiment of the present disclosure.

FIG. 5 is a flowchart of a detection method for ambient light according to an embodiment of the present disclosure, the detection method may be applied to the detection circuit for ambient light according to any embodiment of the present disclosure, the detection method may be performed by a control module in the display apparatus, and the control module may be, for example, a single-chip microcomputer, a programmable logic device, or the like. As shown in FIG. 5, the method may include the following steps.

In S110, each current conversion module is controlled to be turned on synchronously in a sampling period.

In S120, a sampling control signal is output synchronously to each storage module within an on-duration of the current conversion module, so as to control each storage module to store a voltage sensing signal output by the current conversion module connected to the storage module.

In S130, the voltage sensing signal stored in each storage module is obtain respectively, and preprocessing is performed on each voltage sensing signal.

According to the detection method of the present disclosure, in a sampling period, the control module may control the current conversion module connected to each sensing module to be turned on synchronously, so that each current sensing module can output a voltage sensing signal based on a same moment. The control module further outputs a sampling control signal SMPL synchronously to each storage module, and controls each storage module to store the voltage sensing signal output by the current conversion module connected to the storage module, so that it may be ensured that the voltage sensing signal stored in each storage module is the voltage sensing signal at the same moment, thus solving the problem that the light signals of different sensing modules are not synchronized in the related art.

The above steps of the example embodiment will be described in more detail below.

In step S110, the control module controls each current conversion module to be turned on synchronously in a sampling period.

As described in the above embodiments, the current conversion module may include a signal amplification unit, a gain adjustment unit and a feedback unit. The signal amplification unit may include an operational amplifier, an input end of the operational amplifier is connected to a reference voltage end, and the other input end of the operational amplifier is connected to an output end of the corresponding sensing module. The gain adjustment unit may include a plurality of gain branches connected in parallel, each gain branch may include a gain resistor and a gain control switch, the gain resistor is connected in series with the gain control switch, and the gain control switch may be configured to turn on the corresponding gain branch in response to the gain control signal Gain to adjust the gain coefficient of the gain adjustment unit. The feedback unit may include a feedback capacitor, and the feedback capacitor is connected in parallel to two ends of the gain branches. In a sampling period, the control module may output the gain control signal Gain of the on-level to the gain control switch according to the preset time sequence as shown in FIG. 4, so as to turn on each gain branch in a time-sharing manner. Since each current conversion module has the same circuit structure, the control module may output the gain control signal Gain synchronously to each current conversion module to synchronously turn on the gain branch of the same gain coefficient in each current conversion module. For example, the control module may output the first gain control signal Gain1 synchronously to the first gain branch in the first current conversion module, the first gain branch in the second current conversion module, the first gain branch in the third current conversion module, and the first gain branch in the fourth current conversion module, so that the four first gain branches are turned on synchronously.

Then, the control module outputs the second gain control signal Gain2 simultaneously to the first current conversion module to the fourth current conversion module, so that the four second gain branches are turned on synchronously, and so on. The control module may control each current conversion module to be turned on synchronously, so that each current conversion module can synchronously output the voltage sensing signal of the same gain level.

In step S120, within the on-duration of the current conversion module, the control module outputs the sampling control signal SMPL of the on-level synchronously to each storage module to control each storage module to store the voltage sensing signal output by the current conversion module connected to the storage module.

For example, the control module may output the sampling control signal SMPL in a time-sharing manner as shown in FIG. 4. Within the on-level duration of each gain control signal Gain, the control module outputs the sampling control signal SMPL of the on-level to each sampling switch to control each sampling switch to be turned on synchronously, so that each storage module can synchronously store the voltage sensing signal of the same gain level.

In other words, after outputting the gain control signal Gain of the on-level for a preset duration, the control module may output the sampling control signal SMPL of the on-level synchronously to each storage module to control each storage module to store the voltage sensing signal output by the current conversion module connected to the storage module. Among them, the on-level of the sampling control signal SMPL at least partially overlaps with the on-level of the gain control signal Gain.

As described above, the storage module may include a filtering unit and a sampling switch, the filtering unit is connected between the corresponding operational amplifier and the gating module, the sampling switch is connected in series between the filtering unit and the corresponding operational amplifier, and the control end of the sampling switch receives the sampling control signal SMPL; where, in response to the sampling control signal SMPL, the sampling switch transmits the voltage sensing signal output by the conversion unit connected to the sampling switch to the filtering unit for storage. The filtering unit may be formed by a filtering resistor and a storage capacitor. When the sampling switch obtains the sampling control signal SMPL of the on-level, the sampling switch is turned on to connect the filtering unit to the output end of the operational amplifier at the corresponding position, so that the voltage sensing signal at the current sampling moment can be stored. Since each sampling switch obtains the sampling control signal SMPL of the on-level synchronously, each filtering unit can store the voltage sensing signal at the current moment synchronously.

In step S130, the control module obtains the voltage sensing signal stored in each storage module respectively, and performs preprocessing on each voltage sensing signal.

As described above, the detection circuit may further include a gating module, an analog-to-digital conversion module and a level-shift module. Among them, the gating module is connected in series between the storage module and the control module, and the gating module may be configured to turn on the communication path between the corresponding storage module and the control module in response to the gating control signal MX output by the control module. The analog-to-digital conversion module is connected in series between the gating module and the control module, and the analog-to-digital conversion module may be configured to convert the obtained voltage sensing signal into a digital voltage signal for output. The level-shift module is connected to the control module, and the level-shift module may be configured to shift each control signal (including the sampling control signal SMPL, the gain control signal Gain, and the gating control signal MX) of the control module into a corresponding level signal and output the level signal to the corresponding switch module.

On this basis, step S130 may include the following steps.

A gating control signal MX is output to the gating module, so as to transmit the voltage sensing signal stored in the corresponding storage module to the analog-to-digital conversion module, and the analog-to-digital conversion module converts the obtained voltage sensing signal into a digital voltage signal.

Selection is performed on the digital voltage signal.

If the digital voltage signal is an effective voltage signal, the effective voltage signal is stored.

Among them, the gating module may include a plurality of gating switches MUX. The number of gating switches MUX is in one-to-one correspondence with the number of the storage modules; that is, a gating switch MUX controls the connection between a storage module and the analog-to-digital conversion module. The control module may sequentially output the gating control signal MX of the on-level to each gating switch MUX to control each storage module to sequentially output the voltage sensing signal stored therein to the analog-to-digital conversion module, where the voltage sensing signal is converted into a digital voltage signal by analog-to-digital conversion module.

It should be noted that the control module of the present disclosure may perform selection on the obtained digital voltage signal, that is, to perform selection on the digital voltage signal of each gain level. When the digital voltage signal is within the preset voltage range, the control module determines that the digital voltage signal is an effective voltage signal, and stores the effective voltage signal. When the digital voltage signal is not within the preset voltage range, the control module discards the digital voltage signal. In some embodiments, when the digital voltage signals corresponding to the voltage sensing signals of more than one gain level are within the preset voltage range, the control module may store a digital voltage signal having the maximum value as the effective voltage signal of the current sampling period.

An external circuit may directly read the data in the specified memory through a serial interface, and the serial interface may be, for example, an I2C serial interface or a SPI serial interface, or other serial interfaces.

The present disclosure further provides a display apparatus, which may include the detection circuit for ambient light described in any of the above embodiments. The display apparatus may be, for example, a mobile phone, a PAD, or the like. The display apparatus may perform display and adjustment on the display apparatus through the ambient light detected by the detection circuit for ambient light, for example, may automatically adjust the display brightness of the display apparatus according to the ambient light.

Other embodiments of the present disclosure will be apparent to those skilled in the art from consideration of the specification and practice of the present disclosure. The present disclosure is intended to cover any variations, uses, or adaptations of the present disclosure following the general principles of the present disclosure and including the common knowledge and conventional technical means in the art not disclosed in the present disclosure. It is intended that the description and embodiments are considered as examples only, with a true scope and spirit of the present disclosure being indicated by the appended claims.

What is claimed is:

1. A detection circuit for ambient light, configured to perform ambient light detection on a display panel, wherein the detection circuit comprises:

a plurality of sensing modules, wherein a sensing module of the plurality of sensing modules is configured to collect ambient light and output a current sensing signal based on the ambient light;

a plurality of current conversion modules, provided correspondingly to the plurality of sensing modules, wherein a current conversion module of the plurality of current conversion modules is configured to convert a current sensing signal output by a sensing module connected to the current conversion module into a voltage sensing signal;

a plurality of storage modules, provided correspondingly to the plurality of current conversion modules, wherein a storage module of the plurality of storage modules is configured to store a voltage sensing signal output by a current conversion module connected to the storage module in response to a sampling control signal;

a control module, connected to the plurality of storage module respectively, wherein the control module is configured to output the sampling control signal synchronously to each storage module of the plurality of storage modules;

a gating module, connected in series between the plurality of storage modules and the control module, wherein the gating module is configured to turn on a communication path between a corresponding storage module and the control module in response to a gating control signal output by the control module;

an analog-to-digital conversion module, connected in series between the gating module and the control module, wherein the analog-to-digital conversion module is configured to convert an obtained voltage sensing signal into a digital voltage signal for output; and a level-shift module, connected to the control module, wherein the level-shift module is configured to shift the sampling control signal into a corresponding level signal for output.

2. The detection circuit according to claim 1, wherein the current conversion module comprises:

a signal amplification unit, wherein an input end of the signal amplification unit is connected to a reference voltage end, and another input end of the signal amplification unit is connected to an output end of a corresponding sensing module;

a gain adjustment unit, wherein an end of the gain adjustment unit is connected to the output end of the corresponding sensing module, another end of the gain adjustment unit is connected to an output end of the signal amplification unit, and the gain adjustment unit is configured to determine the voltage sensing signal according to a selected gain coefficient; and a feedback unit, connected in parallel to two ends of the gain adjustment unit, wherein the feedback unit is configured to prevent the signal amplification unit from being self-excited.

3. The detection circuit according to claim 2, wherein the gain adjustment unit comprises a plurality of gain branches connected in parallel, and a gain branch of the plurality of gain branches comprises:

a gain resistor;

a gain control switch, connected in series with the gain resistor, wherein the gain control switch is configured to turn on a corresponding gain branch in response to a gain control signal output by the control module, to adjust a gain coefficient of the gain adjustment unit;

the feedback unit comprises:

a feedback capacitor, connected in parallel between two ends of the gain branch; and the signal amplification unit comprises:

an operational amplifier, wherein an input end of the operational amplifier is connected to the reference voltage end, and another input end of the operational amplifier is connected to an output end of a corresponding sensing module.

4. The detection circuit according to claim 3, wherein a ratio of an on-resistance of the gain control switch to a gain resistance connected to the gain control switch is less than or equal to 1%.

5. The detection circuit according to claim 3, wherein a ratio of a leakage current of the gain control switch to a sensing current of a sensing module connected to the gain control switch is less than or equal to 1%.

6. The detection circuit according to claim 3, wherein gain branches with a same gain coefficient in different current conversion modules multiplex with a same gain control signal; and on-levels of gain control signals corresponding to gain branches with different gain coefficients do not overlap with each other.

7. The detection circuit according to claim 6, wherein in a process of performing light signal collection according to a gain coefficient, an on-level of the sampling control signal at least partially overlaps with an on-level of the gain control signal, and an on-level start time of the sampling control signal is later than an on-level start time of the gain control signal.

8. The detection circuit according to claim 3, wherein the gain adjustment unit comprises a first gain branch, a second gain branch, a third gain branch and a fourth gain branch; and, a resistance value of a gain resistor in the first gain branch, a resistance value of a gain resistor in the second gain branch, a resistance value of a gain resistor in the third gain branch, and a resistance value of a gain resistor in the fourth gain branch are increased sequentially.

9. The detection circuit according to claim 3, wherein the control module is further configured to:

obtain a digital voltage signal corresponding to a voltage sensing signal output by each gain branch; and select a digital voltage signal in a preset voltage range as an effective voltage signal.

10. A detection method for ambient light, applied to the detection circuit for ambient light according to claim 4, wherein the detection method is performed by a control module, and the detection method comprises:

outputting a gain control signal in a time-sharing manner according to a preset time sequence in a sampling period, to turn on each gain branch in a time-sharing manner;

after outputting a gain control signal of an on-level for a preset duration, outputting a sampling control signal of an on-level synchronously to each storage module to control each storage module to store a voltage sensing signal output by a current conversion module connected to the storage module, wherein the on-level of the sampling control signal at least partially overlaps with the on-level of the gain control signal;

outputting a gating control signal to the gating module to transmit a voltage sensing signal stored in a corresponding storage module to the analog-to-digital conversion module, wherein the obtained voltage sensing signal is converted into a digital voltage signal by the analog-to-digital conversion module;

performing selection on the digital voltage signal; and if the digital voltage signal is an effective voltage signal, storing the effective voltage signal.

11. The detection circuit according to claim 1, wherein the storage module comprises:

a filtering unit, connected between a corresponding operational amplifier and the gating module; and a sampling switch, connected in series between the filtering unit and the corresponding operational amplifier, wherein a control end of the sampling switch receives the sampling control signal;

wherein, in response to the sampling control signal, the sampling switch transmits a voltage sensing signal output by a current conversion module connected to the sampling switch to the filtering unit for storage.

12. The detection circuit according to claim 11, wherein the filtering unit comprises:

a filtering resistor, wherein an end of the filtering resistor is connected to a first end of the filtering unit, and another end of the filtering resistor is connected to a second end of the filtering unit; and a storage capacitor, wherein an end of the storage capacitor is connected to the second end of the filtering unit, and another end of the storage capacitor is grounded.

13. The detection circuit according to claim 12, wherein the gating module comprises:

a plurality of gating switches, wherein the plurality of gating switches are provided in one-to-one correspondence with the plurality of storage modules, and a control end of a gating switch receives the gating control signal;

wherein a ratio of a time constant formed by an off-resistance of a gating switch and the storage capacitor to a sampling period is greater than or equal to 10/n, n is a number of gain branches comprised in the current conversion module, and n is a positive integer greater than or equal to 1.

14. The detection circuit according to claim 1, wherein the plurality of sensing modules comprises a first sensing module, a second sensing module, a third sensing module and a fourth sensing module; the first sensing module is configured to sense ambient red light, the second sensing module is configured to sense ambient green light, the third sensing module is configured to sense ambient blue light, and the fourth sensing module is configured to sense white light.

15. A detection method for ambient light, applied to the detection circuit for ambient light according to claim 1, wherein the detection method is performed by a control module, and the detection method comprises:

controlling each current conversion module to be turned on synchronously in a sampling period;

outputting a sampling control signal of an on-level synchronously to each storage module within an on-duration of the current conversion module, to control each storage module to store a voltage sensing signal output by a current conversion module connected to the storage module; and obtaining a voltage sensing signal stored in each storage module respectively, and preforming preprocessing on each voltage sensing signal.

16. A detection method for ambient light, applied to the detection circuit for ambient light according to claim 1, wherein the detection method is performed by a control module, and the detection method comprises:

controlling each current conversion module to be turned on synchronously in a sampling period;

outputting a sampling control signal synchronously to each storage module within an on-duration of the current conversion module, to control each storage module to store a voltage sensing signal output by a current conversion module connected to the storage module;

outputting a gating control signal to the gating module to transmit a voltage sensing signal stored in a corresponding storage module to the analog-to-digital conversion module;

performing selection on the digital voltage signal; and in response to the digital voltage signal being an effective voltage signal, storing the effective voltage signal.

17. A display apparatus, comprising a detection circuit for ambient light, configured to perform ambient light detection on a display panel of the display apparatus, wherein the detection circuit comprises:

a plurality of sensing modules, wherein a sensing module of the plurality of sensing modules is configured to collect ambient light and output a current sensing signal based on the ambient light;

a plurality of current conversion modules, provided correspondingly to the plurality of sensing modules, wherein a current conversion module of the plurality of current conversion modules is configured to convert a current sensing signal output by a sensing module connected to the current conversion module into a voltage sensing signal;

a plurality of storage modules, provided correspondingly to the plurality of current conversion modules, wherein a storage module of the plurality of storage modules is configured to store a voltage sensing signal output by a current conversion module connected to the storage module in response to a sampling control signal; and a control module, connected to the plurality of storage module respectively, wherein the control module is configured to output the sampling control signal synchronously to each storage module of the plurality of storage modules;

a gating module, connected in series between the plurality of storage modules and the control module, wherein the gating module is configured to turn on a communication path between a corresponding storage module and the control module in response to a gating control signal output by the control module;

an analog-to-digital conversion module, connected in series between the gating module and the control module, wherein the analog-to-digital conversion module is configured to convert an obtained voltage sensing signal into a digital voltage signal for output; and a level-shift module, connected to the control module, wherein the level-shift module is configured to shift the sampling control signal into a corresponding level signal for output.

18. The display apparatus according to claim 17, wherein the current conversion module comprises:

a signal amplification unit, wherein an input end of the signal amplification unit is connected to a reference voltage end, and another input end of the signal amplification unit is connected to an output end of a corresponding sensing module;

a gain adjustment unit, wherein an end of the gain adjustment unit is connected to the output end of the corresponding sensing module, another end of the gain adjustment unit is connected to an output end of the signal amplification unit, and the gain adjustment unit is configured to determine the voltage sensing signal according to a selected gain coefficient; and a feedback unit, connected in parallel to two ends of the gain adjustment unit, wherein the feedback unit is configured to prevent the signal amplification unit from being self-excited.

* * * * *